United States Patent [19]

Hill

[11] Patent Number: 4,925,009

[45] Date of Patent: May 15, 1990

[54] PORTABLE CONVEYOR

[75] Inventor: Reinier Hill, Hamilton, Canada

[73] Assignee: AEC Machinery Limited, Hamilton, Canada

[21] Appl. No.: 115,749

[22] Filed: Nov. 2, 1987

[51] Int. Cl.⁵ .............................................. B65G 21/06
[52] U.S. Cl. .................................. 198/583; 198/860.2; 198/841
[58] Field of Search ............... 198/576, 583, 584, 806, 198/814, 816, 860.2, 840, 841, 575, 813

[56] References Cited

U.S. PATENT DOCUMENTS

| | | | |
|---|---|---|---|
| 694,667 | 3/1902 | Rowe | 198/584 |
| 836,938 | 11/1906 | Nelson . | |
| 1,108,386 | 8/1914 | Norton . | |
| 1,603,633 | 10/1926 | Nelson | 198/583 |
| 1,603,634 | 10/1926 | Nelson | 198/583 |
| 1,847,148 | 3/1932 | Vogeley | 198/840 X |
| 1,922,699 | 8/1933 | Jennings et al. | 198/813 X |
| 2,066,383 | 1/1937 | Andrada | 198/813 X |
| 2,200,116 | 5/1940 | Maguire et al. . | |
| 2,438,527 | 3/1948 | Werner . | |
| 2,563,427 | 8/1951 | Scott | 198/583 |
| 2,564,090 | 8/1951 | Ziemann | 198/584 |
| 2,638,204 | 5/1953 | Collis | 198/583 |
| 2,710,683 | 6/1955 | McClenny . | |
| 2,793,738 | 5/1957 | Erickson . | |
| 2,944,054 | 3/1976 | Ensinger . | |
| 3,120,303 | 2/1964 | Leonard | 198/841 X |
| 3,507,380 | 4/1970 | Sarovich et al. | 198/841 X |
| 3,596,752 | 8/1971 | Garvey | 198/841 X |
| 3,711,090 | 1/1973 | Fiedler | 198/841 X |
| 3,743,078 | 7/1973 | Pittoreau . | |
| 3,848,732 | 11/1974 | Catalano | 198/841 X |
| 3,878,937 | 4/1975 | Glaser et al. | 198/816 |
| 3,944,054 | 3/1976 | Ensinger | 198/841 X |
| 4,320,825 | 3/1982 | Buschbom et al. | 198/360 |
| 4,553,664 | 11/1985 | Buschbom et al. | 198/814 |
| 4,650,067 | 3/1987 | Brul',acu/e/ | 198/841 |

Primary Examiner—David A. Bucci
Assistant Examiner—D. Glenn Dayoan
Attorney, Agent, or Firm—Fleit, Jacobson, Cohn, Price, Holman & Stern

[57] ABSTRACT

A conveyor device is disclosed having a drive unit and a follower unit, each of which has a roller with a peripheral surface to carry a reversing portion of a continuous belt, an engaging element to engage the units with one end portion of a plank defining a belt support surface, so as to align the belt support surface with the peripheral surface.

17 Claims, 4 Drawing Sheets

PORTABLE CONVEYOR

The present invention relates to conveyors.

Conveyors are well-known for providing an efficient transfer of materials from one location to another by means of moving belts, rollers or the like. The belt-type conveyor is perhaps the most common, in view of the ability to use a single prime mover to drive a belt between a drive roller and a follower roller. However, conventional belt conveyors have several drawbacks. Firstly, it is essential that precise alignment is made between the belt and the drive and follower cylinders at its remote ends, otherwise an unreasonably high rate of wear will occur at the peripheral edges of the belt. Moreover, this precision must be maintained through a wide range of loading conditions. These requirements typically require the conveyor to be a permanent installation.

Obviously such permanent installations are not applicable to some commercial applications, for example, market gardens or greenhouses, where the need of the conveyor in a given area arises for a short period of time, that is until the produce in that given area is depleted. The vast majority of currently portable conveyors suitable for these applications have up until now been factory preassembled to lengths of 14 or 15 feet. These dimensions render the units ackward to ship and therefore significantly increase the cost of such conveyors. It has been proposed that portable conveyors be shipped in disassembled form. However, these conveyors require a complex and time-consuming assembly by the end user, who often does not have the tools required to assemble the conveyor.

It would therefore be desirable to provide a conveyor which is not only rugged, simple to operate and inexpensive, but is also portable in disassembled form.

It is thus an object of the present invention, to obviate or mitigate the above identified disadvantages by providing a novel form of conveyor.

Broadly stated the invention comprises a conveyor device comprising a drive unit and a follower unit each of which has a roller with a peripheral surface to carry a reversing portion of a continuous belt, and engagement means to engage said unit with one end portion of a plank defining a belt support surface so as to align said belt support surface with said peripheral surface.

A preferred embodiment of the present invention will now be described, by way of example only, with reference to the accompanying drawings, in which.

Figure 1:
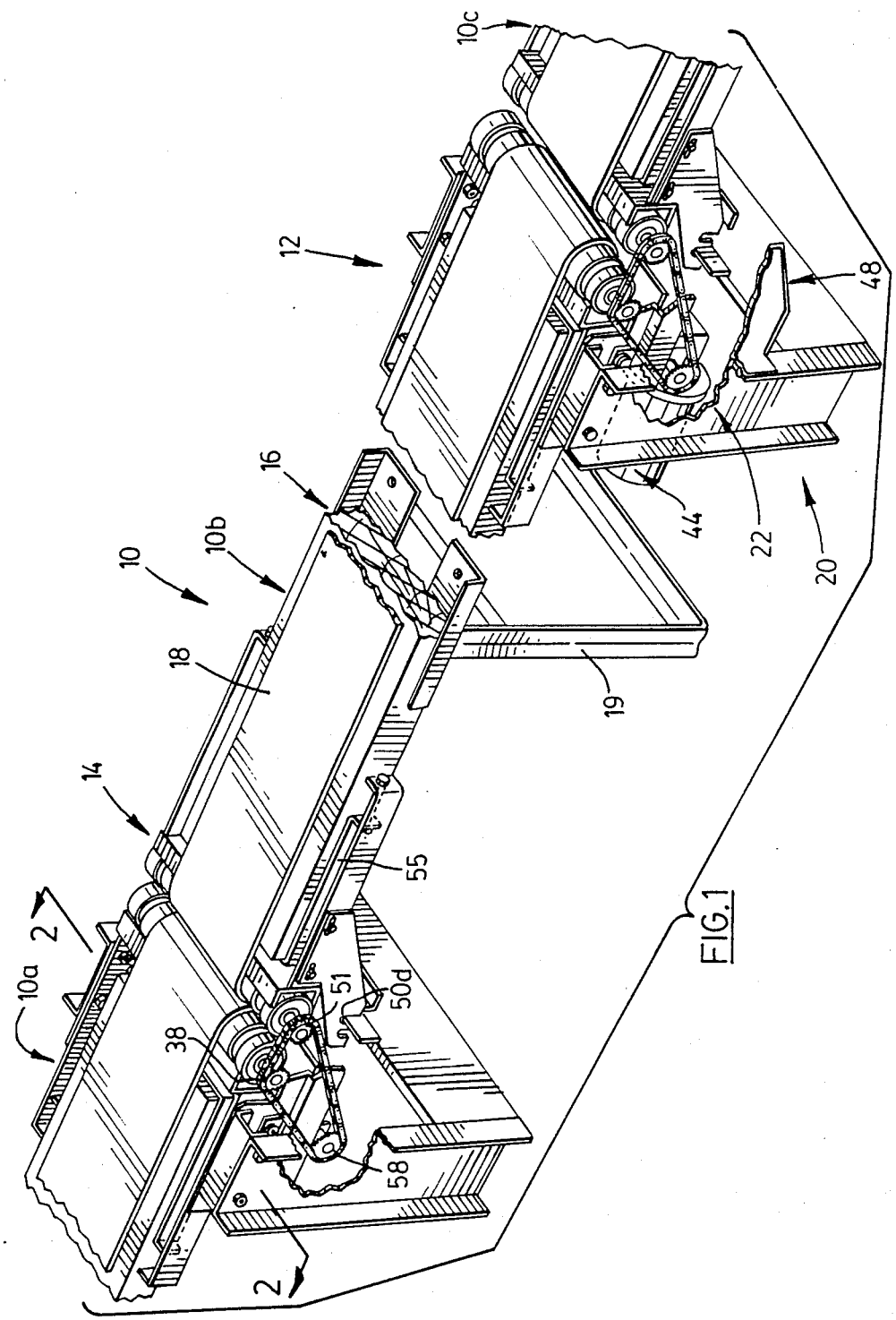
FIG. 1 is a fragmentary perspective view of a conveyor device.

Referring now to the figures, there is provided a conveyor 10 formed from a number of sections, three of which are identified in FIG. 1 at 10a, 10b, 10c. Section 10b has a drive end 12 and a follower end 14 which are arranged at the ends of a wooden plank 16 carrying a belt 18 and supported by a pair of plank supports 19.

As will be described, the drive and follower ends 12, 14 respectively are easily assembled and provide a simple technique for aligning the belt 18 relative to the respective ends. In addition, the conveyor 10 provides a unique power transfer arrangement between adjacent conveyors, thereby enabling power to originate from a single drive.

Figure 4:
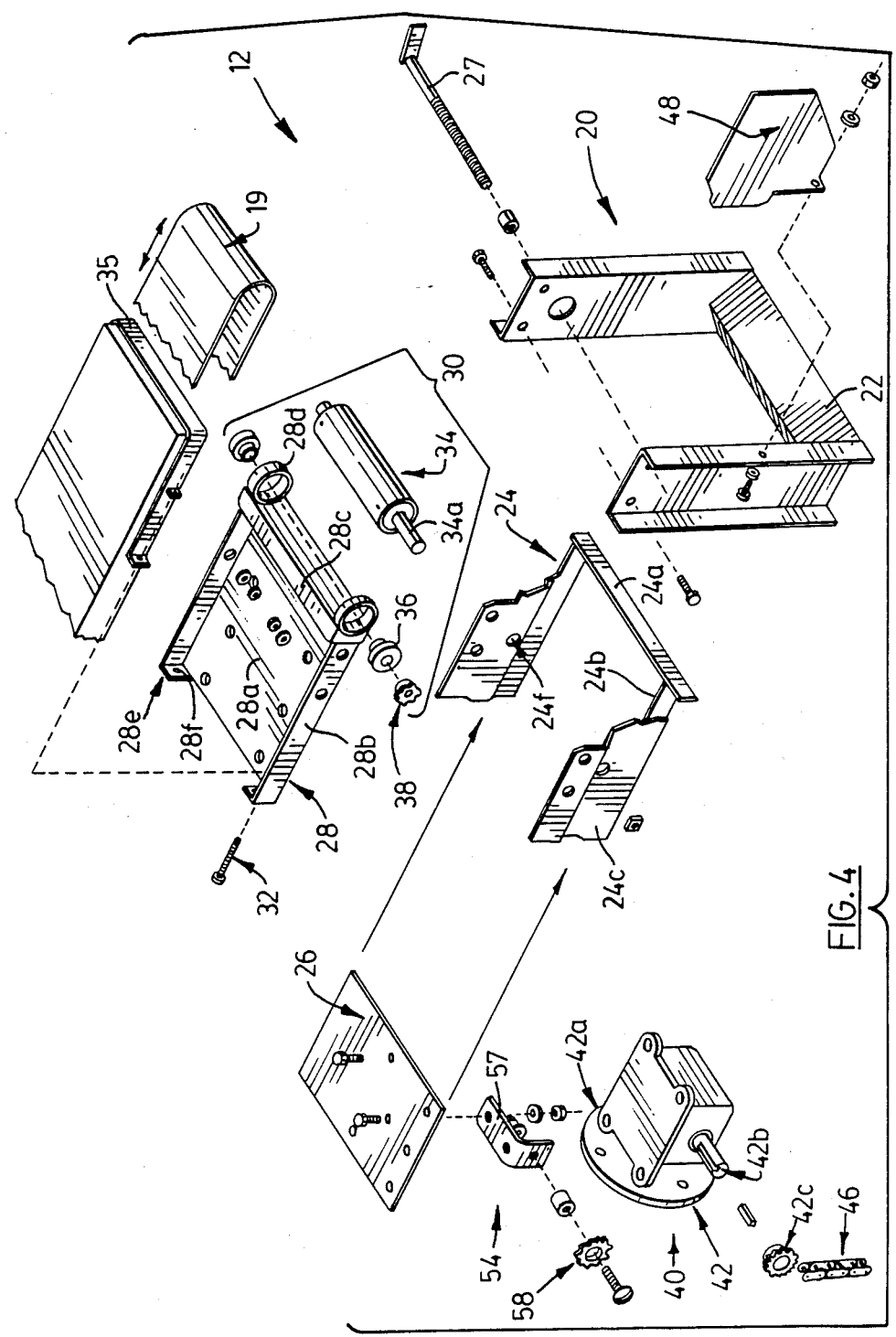
FIG. 4 is an exploded view of several other portions of the device illustrated in FIG. 3.

As is illustrated in FIG. 4, the drive end 12 is formed from a frame 20 which includes an end support 22 and a male connecting bracket 24 enabling the drive end to be interconnected with the follower end, as will be described. The connecting bracket includes an end flange 24a and a pair of parallel arms 24b extending from one side. A pair of side flanges 24c are attached to a laterally outward face of the arms 24b and are bent to form central webs 24d.

Figure 2:
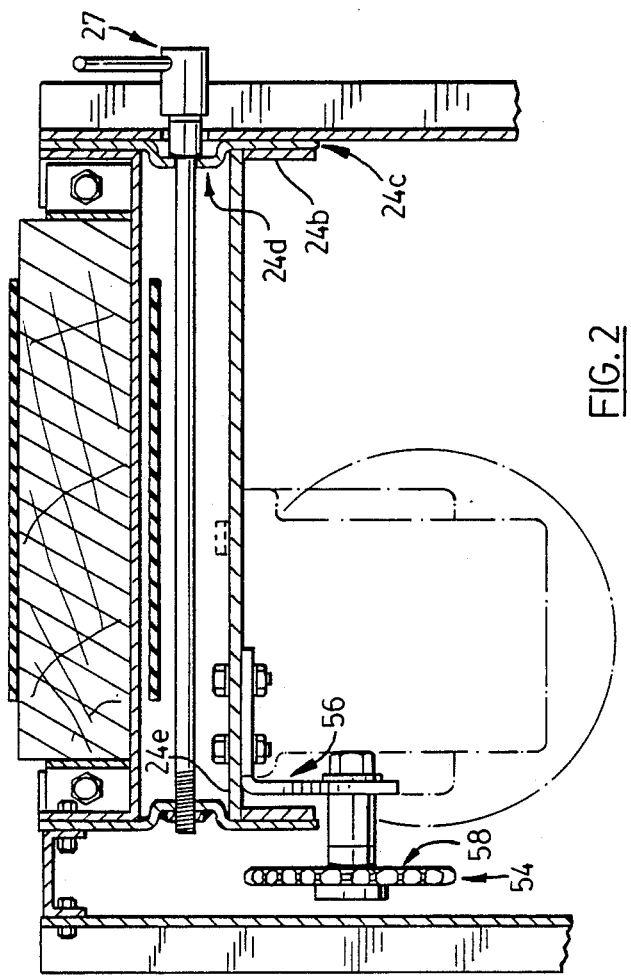
FIG. 2 is a sectional view taken on line 2—2 of FIG. 1.
Figure 3:
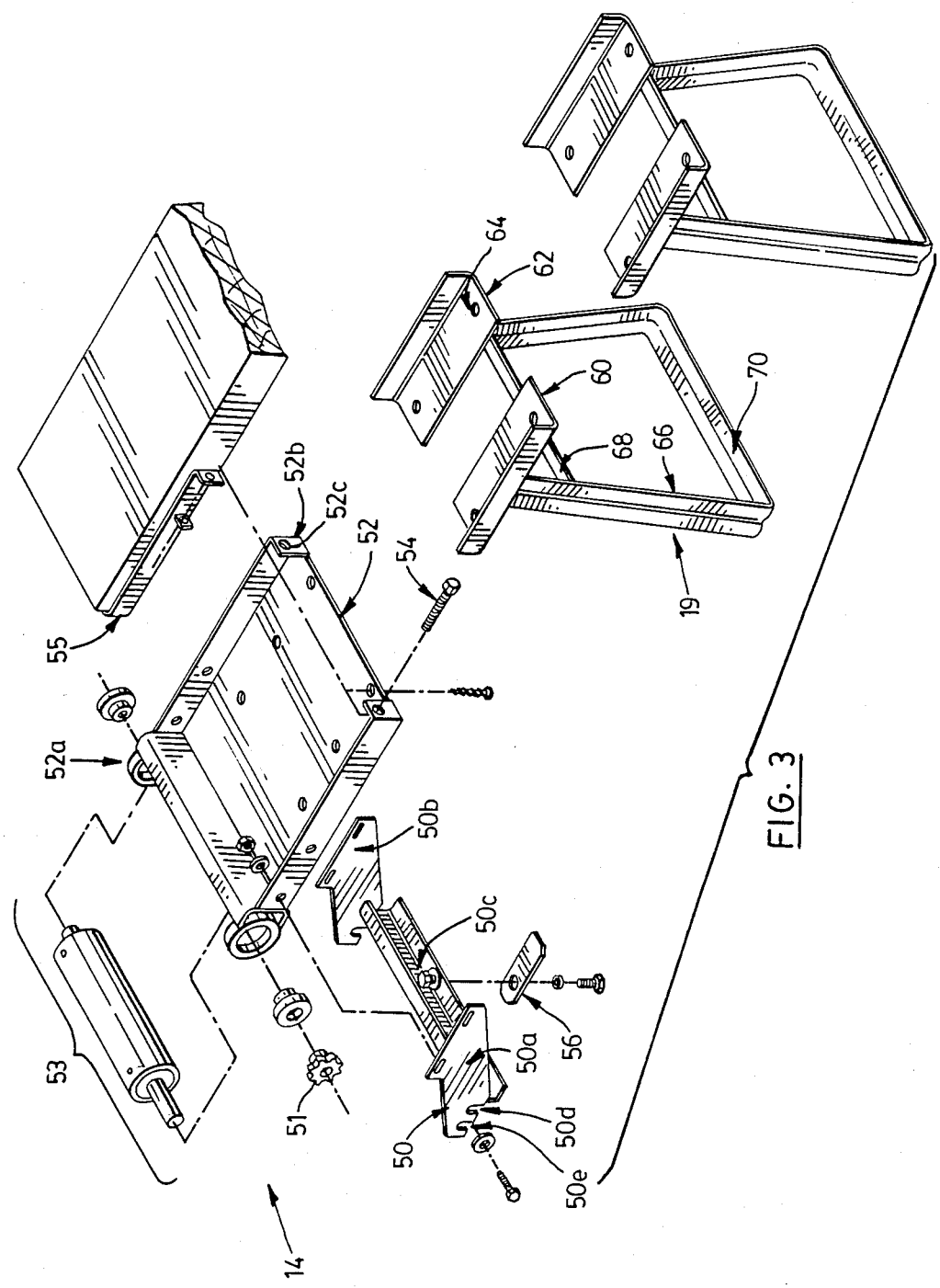
FIG. 3 is an exploded view of several portions of the device illustrated in FIG. 1.

As may be seen in FIG. 2, the central web 24d and arms 24b cooperate to form a groove 24e along and immediately above the arms 24b, to receive a slide plate 26. As well, a bore 24f is formed in each of the central webs 24d to receive a tightening bolt 27, which enables the end support 22, the connecting bracket 24 and the sliding plate 26 to be coupled rigidly without the need of complex welding procedures, and therefore adds to the simplicity of the conveyor assembly. Mounted on the connecting bracket is an end tray 28 which receives a respective end of plank 16. The end tray 28 includes a rectangular base plate 28a and a pair of upwardly extending side flanges 28b. Attached to one edge of the base plate 28a is a support member 28c of a "C"-shaped cross section with a pair of arms extending outwardly from the base plate 28b. The arms carry a pair of bearing support flanges 28d located at each end of the support member 28c to receive a roller assembly shown collectively at 30. The roller assembly includes a roller assembly 34, with a shaft 34a, which is rotatably supported by way of bearings 36 held in the bearing support flanges 28d. A drive sprocket 38 is also keyed on one end of the shaft 34a of the roller 32, thereby enabling power to be delivered to the belt 19.

At the opposite end of the base plate 28a are a pair of flanges 28e attached to the edges of the base plate 28a, and the side walls 28b. The end flanges 28e are each provided with a bore 28f which is dimensioned to receive a tightening bolt 32 in non-threaded fashion. The head end portions of each tightening bolt 32 is then rotatably anchored to the respective end flange 28e while being threaded to a board tightening strap 35, extending around the peripheral edge of the plank 16.

Providing power to the drive end 12 is a drive unit 40 including a gear box 42 which is bolted to the lower surface of the side plate 26. The gear box 42 has a mounting flange 42a for mounting a drive motor 44, and an output shaft 42b on which is keyed a drive sprocket 42c to transfer power to the belt 19 via a chain 46. In addition, the drive end is provided with a chain guard 48 which conceals the assembled drive and follower ends, as will be described.

The follower end 14 has a female connecting bracket 50 which is engageable with the male connecting bracket 24 as will be described. The female connecting bracket 50 includes a pair of side flanges 50a, 50b attached at respective ends of a transverse support member 50c. The side flanges 50a, 50b each have a lower edge in which are formed a pair of notches 50d, 50e for adjustable coupling with the male connecting bracket 24 as will be described. The side flanges 50a, 50b are each mounted on an end tray 52 which is identical to the end tray 28, by including bearing support flanges 52a, roller assembly 53 and end flanges 52b, with holes 52c to receive a tightening bolt 54. As with the end tray 28, a tightening bolt is threaded into a tightening strap 55, shown in FIG. 1. A locking member 56 is pivotally mounted to the transverse support member 50c of the female connecting bracket 50 and maintains the coupling of the connecting brackets as will be described.

A variation of the drive end 12 of conveyor section 10b is illustrated in FIG. 4, as is used on conveyor section 10a, wherein an idler gear is provided in lieu of the gear box and motor arrangement, and includes an angular member 57 which is mounted on the lower surface of the slide plate 26. A sprocket 58 is rotatably mounted on the depending arm of the angular member 57 and provides three point entrainment of the chain between the drive and follower ends of interconnected conveyors, sections 10a, 10b. This enables one drive motor to be applied to a number of conveyors as will be described.

Provision is made for one or a number of plank supports 19 to be coupled to the plank 16, with the number of such supports depending on the load to be conveyed. The plank support 19 has a pair of angular plates 60, 62, each of which abuts opposite bottom side sections of the plank. A pair of bores 64 are provided in each of the plates so that the support may, if desired, be fastened against the plank for added support. The plates 60, 62 are fixed on a base comprising a pair of inclined leg portions 66 joined by an upper and a lower spanner identified at 68, 70 respectively.

A particular feature of the conveyor 10 is the capability of the components to be sent to the user in kit form with the required on-site assembly being simple and expeditious. The contents of the kit would depend on the end use and load requirements of the conveyor, since the alternative drive end sections enables the conveyor to be assembled in one of a number of configurations.

In the present case, the kit would contain sufficient hardware to assemble the conveyor formed from three conveyor sections and driven by a single drive unit, as illustrated in FIG. 1. The three planks 16 necessary to assemble the sections would not be included in the kit but rather would be purchased by the user from a local lumber yard and cut and squared to the appropriate length. The drive and follower ends 12, 14 and the desired number of plank supports 19 are then assembled on the planks to form each end section as illustrated, with each end of the plank being placed in the respective end tray 28, 52. The tightening straps 35, 55 are then positioned on the respective ends of the plank, with the tightening bolts 32, 54 threaded loosely to enable the belt 19 to be entrained around the end rollers of each end section. With the belt in place, the tightening bolts are then turned an equal number of rotations, causing the base plate to move in the direction of the end of its associated plank. This, in turn, causes the same movement of the roller beyond the end of the plank to take up the slack in the belt. In this fashion, automatic alignment results from the balanced tensioning of the tightening strap 30 and ensures that this alignment will be maintained, regardless of the loading conditions imparted on the conveyor. This is provided by virtue of the end tray, which maintains the alignment of the end cylinder 32 relative to the end flanges, which themselves are aligned with the plank by the balanced tensioning of the tightening bolts. In this manner, conveyor sections 10a, 10b, 10c are assembled and may be arranged in line as shown for interconnection.

The follower end of conveyor section 10b, is supported on the drive end of the adjacent conveyor section 10a, by initially aligning the inner grooves 50d on the flange 24a. The chain 46 is then entrained around the idler sprocket 58 and the belt sprockets 38, 51. When the chain is in place, the follower end may then be lifted to separate the respective ends and to align the outer grooves 50e with the flange 24a, thereby increasing the tension of the chain. This eliminates the need for a chain adjustment mechanism, and therefore adds to the simplicity of the device. This procedure is repeated for interconnecting conveyor sections 10b and 10c. In this case, the chain is entrained the motor drive sprocket 42c and both of the belt sprockets 38 and 51. Again, the chain is tensioned by setting the flange 24a in the outer notch 50e, as shown in FIG. 1.

When the sections are connected, the female connecting bracket 55 is pivoted to abut the lower edge of the connecting flange 24a of each drive end section, and therefore ensures that the conveyor sections will remain interconnected during use.

If desired, the conveyor 10 may be conveniently lengthened either by extending the length of each of the planks 16 or by adding additional conveyor sections. In addition, a continuous conveyor may be formed with one driving motor unit, or with a number of such units. The plank may further be manufactured from other material such as reinforced plastics or metals or be laminated to provide an increased strength.

Thus, the present invention thus provides an inexpensive conveyor which is easily assembled from a number of other conveyor sections to provide an easily portable conveyor system, but also provides facilitated alignment of the belt with the cylinders, simply by tightening the four bolts on the two tightening flanges.

I claim:

1. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said drive station including a support section to maintain said belt support surface at a given elevation; said drive station having a first coupling means and said follower station having a second coupling means complementary with said first coupling means for interconnection therewith when a pair of said conveyor devices are coupled together; said first and second coupling means being arranged to enable said support section to maintain the belt support surface of an adjacent conveyor at said given elevation; said first and second coupling means being arranged to connect said drive and follower end stations together in one of a number of alternative positions; said first and second coupling means including releasable locking means for releasably locking said drive and follower stations when coupled together; and wherein said releasable locking means includes a lever pivoted to said follower station and arranged for abutment with a frame portion of said drive station, so as to inhibit release of said first and second coupling means.

2. A conveyor device as defined in claim 1, wherein said first coupling means has a first flange and said second coupling means has a second flange complementary with said first flange for interengagement therewith.

3. A conveyor device as defined in claim 2, wherein said plank has a central axis, said first flange is transversely arranged relative to said central axis and said second coupling means has a pair of said second flanges longitudinally arranged with respect to said central axis, each of said second flanges has formations to engage said first flange.

4. A conveyor device as defined in claim 3, wherein said first flange extends in an upward direction, each of said second flanges has a lower edge with a number of recesses formed therein and each of said recesses receives, said first flange in one of said positions.

5. A conveyor device as defined in claim 1, wherein said drive station includes a drive mechanism arranged to displace said roller.

6. A conveyor device as defined in claim 5, wherein said drive mechanism has an output sprocket connectable to a drive sprocket which is fixed for rotation with said roller, by way of a chain.

7. A conveyor device as defined in claim 6, wherein said chain is of a length providing said chain to be removed from said output sprocket and said drive sprocket when said first and second coupling means are in one position, and to be tensioned when said coupling means are in another position.

8. A conveyor device as defined in claim 7, wherein said follower station includes a sprocket fixed for rotation with said roller and alignable for engagement with said chain, thereby enabling said drive mechanism to drive a pair of adjacent belts when a pair of said conveyor devices are coupled together.

9. A conveyor device as defined in claim 8, wherein said drive mechanism includes an idler sprocket aligned with the follower sprocket of one conveyor device and the drive sprocket of another conveyor device, whereby upon engagement of said chain therewith, power may be transferred from said follower sprocket to said drive sprocket to enable the drive station of one conveyor to impart motion on the belts of both conveyor devices.

10. A conveyor device as defined in claim 1, further comprising a belt of a given width to be entrained on said roller, said belt support surface having a transverse dimension substantially equal to said width.

11. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said drive station including a support section to maintain said belt support surface at a given elevation; said drive station having a first coupling means and said follower station having a second coupling means complementary with said first coupling means for interconnection therewith when a pair of said conveyor devices are coupled together; said first and second coupling means being arranged to enable said support section to maintain the belt support surface of an adjacent conveyor at said given elevation; said support section including a stand section and a main body section, said main body section having a pair of parallel longitudinal flanges arranged to interconnect said mounting means therewith; and said conveyor device further comprising a base plate, wherein each of said longitudinal flanges is provided with an elongate groove to engage slidably with said base plate.

12. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said drive station including a support section to maintain said belt support surface at a given elevation; said drive station having a first coupling means and said follower station having a second coupling means complementary with said first coupling means for interconnection therewith when a pair of said conveyor devices are coupled together; said first and second coupling means being arranged to enable said support section to maintain the belt support surface of an adjacent conveyor at said given elevation; said support section including a stand section and a main body section, said main body section having a pair of parallel longitudinal flanges arranged to interconnect said mounting means therewith; said conveyor device further comprising a base plate, wherein each of said longitudinal flanges is provided with an elongate groove to engage slidably with said base plate; and wherein said stand section has a pair of leg members and said longitudinal flanges are arranged to interconnect said pair of leg members.

13. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said drive station including a support section to maintain said belt support surface at a given elevation; said drive station having a first coupling means and said follower station having a second coupling means complementary with said first coupling means for interconnection therewith when a pair of said conveyor devices are coupled together; said first and second coupling means being arranged to enable said support section to maintain the belt support surface of an adjacent conveyor at said given elevation; said support section including a stand section and a main body section, said main body section having a pair of parallel longitudinal flanges arranged to interconnect said mounting means therewith; said conveyor device further comprising a base plate, wherein each of said longitudinal flanges is provided with an elongate groove to engage slidably with said base plate; said stand section having a pair of leg members and said longitudinal flanges are arranged to interconnect said pair of leg members; and wherein said longitudinal flanges have a pair of coaxial passages to receive a threaded member, for maintaining said base plate, said longitudinal flanges and said leg members in an interconnected configuration.

14. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said drive station including a support section to maintain said belt support surface at a given elevation; said drive station having a first coupling means and said follower station having a second coupling means complementary with said first coupling means for interconnection therewith when a pair of said conveyor devices are coupled together; said first and second coupling means being arranged to enable said support section to maintain the belt support surface of an adjacent conveyor at said given elevation; said support section including a stand section and a main body section, said main body section having a pair of parallel longitudinal flanges arranged to interconnect said mounting means therewith; said conveyor device further comprising a base plate, wherein each of said longitudinal flanges is provided with an elongate groove to engage slidably with said base plate; and wherein said base plate is arranged to receive a drive assembly.

15. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; said mounting means including a mounting tray to receive said end portion, wherein one end of said mounting tray supports a roller assembly; said mounting tray including a pair of opposite flanges joined at one end by a transverse support member; and said roller assembly including a pair of bearing assemblies, said transverse support member has a ring portion at each end thereof to carry one of said bearing assemblies.

16. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; each of said drive and follower stations further comprising adjustment means to adjust the position of said plank relative to said station when said plank and said stations are coupled together; and wherein said adjustment means includes a strap member to engage a peripheral edge portion of said plank.

17. A conveyor device comprising a drive station and a follower station, each of which has a roller with a peripheral surface to carry a reversing portion of a continuous belt, and mounting means to mount each of said stations with one end portion of a plank defining a belt support surface so as to align said belt support surface with said peripheral surface, said plank having a structural integrity to support articles carried by said belt; each of said drive and follower stations further comprising adjustment means to adjust the position of said plank relative to said station when said plank and said stations are coupled together; said adjustment means including a strap member to engage a peripheral edge portion of said plank; and wherein said strap member is joined at each end to a threaded member which is anchored to said station.

* * * * *